US005983581A

United States Patent [19]

DeBlock et al.

[11] Patent Number: 5,983,581

[45] Date of Patent: Nov. 16, 1999

[54] TUBULAR SKYLIGHT WITH OFFSET DOME

[75] Inventors: David A. DeBlock, Holland; Joel E. Robinson, Charlevoix; Ronald L. Sitzema, Jr., Ellsworth, all of Mich.

[73] Assignee: ODL, Incorporated, Zeeland, Mich.

[21] Appl. No.: 09/083,727

[22] Filed: May 22, 1998

[51] Int. Cl.[6] .......... E04D 13/03; G02B 17/00

[52] U.S. Cl. .......... 52/200; 52/80.1

[58] Field of Search .......... 52/200, 80.1

[56] References Cited

U.S. PATENT DOCUMENTS

| | | | |
|---|---|---|---|
| 3,127,699 | 4/1964 | Wasserman | 52/200 X |
| 4,839,781 | 6/1989 | Barnes et al. . | |
| 4,928,666 | 5/1990 | Mori et al. | 52/200 X |
| 5,408,795 | 4/1995 | Eljadi et al. | 52/200 X |
| 5,467,564 | 11/1995 | DeKeyset et al. | 52/173.3 |
| 5,502,935 | 4/1996 | Demmer . | |
| 5,655,339 | 8/1997 | DeBlock et al. . | |

FOREIGN PATENT DOCUMENTS

| | | |
|---|---|---|
| 1318295 | 3/1992 | France . |
| 4225007 | 2/1994 | Germany . |

*Primary Examiner*—Robert Canfield
*Attorney, Agent, or Firm*—Warner Norcross & Judd LLP

[57] ABSTRACT

A tubular skylight having an improved dome improving the efficiency of the skylight and reducing the shadows cast by the skylight. The dome includes a substantially vertical rear face having an integral prism in a portion of its outer surface, and the rear face is offset inwardly from the perimeter of the reflective tube, thus allowing light to escape from the bottom edge of the rear face downwardly into the reflective tube. The integral prism does not extend to the top or front face of the dome, thus reducing the prevalence of shadows created by light rays entering the dome through the prism.

20 Claims, 5 Drawing Sheets

TUBULAR SKYLIGHT WITH OFFSET DOME

BACKGROUND OF THE INVENTION

The present invention relates to skylights, and more particularly to tubular skylights, which include a reflective tube extending downwardly from the dome.

Tubular skylights have acquired increasing popularity as a means of introducing natural light into a building interior. These skylights include a dome with flashing mounted on the building roof, a light diffuser mounted in the building ceiling, and a reflective tube interconnecting the dome and the diffuser. Natural light entering the skylight through the dome reflects downwardly through the tube to the diffuser. The tube in a sense acts as a gigantic optical fiber. Typically, the domes are fabricated of clear plastic; and the tube is fabricated of aluminum with a reflective coating.

The efficiency of such skylights (i.e. the amount of natural light reaching the building interior) is primarily a function of the amount of light passing through the dome into the tube and of the reflective efficiency of the tube. It is desirable to channel or steer as much light as possible downwardly through the tube to illuminate the building interior. One such approach is seen in U.S. Pat. No. 5,655,339, issued Aug. 12, 1998, to DeBlock et al, and entitled "Tubular Skylight with Improved Dome." This approach utilizes a series of prisms along one portion of the outer surface of a hemispherical dome to reflect light downwardly into the tube. The prisms converge near the top of the hemisphere. However, in direct light the converging prisms cast shadows which can be seen on the underside of the diffuser. Additionally, although the prisms are a significant improvement in directing the light downwardly, improved efficiencies are still desired. Further, the dome is aesthetically deficient when mounted on the roof.

SUMMARY OF THE INVENTION

The aforementioned problems are overcome in the present invention wherein the dome of a tubular skylight has a curved front face and a substantially vertical rear face, the rear face having a prismatic portion to direct light downwardly into the tube.

Preferably, in the northern hemisphere, the dome is positioned so that the rear face is the northern portion of the dome. Consequently, sunlight entering the southern portion or the front face, and to a lesser extent the eastern and western portions, of the dome at relatively low angles is reflected by the prismatic surface on the rear face. In the southern hemisphere, the dome is preferably positioned so that the rear face is the southern portion of the dome.

Even when the sun is higher in the sky, the light rays do not enter the dome through the rear face containing the prismatic portion. Thus, no shadow is cast by the prisms on the underside of the diffuser in direct light.

Additionally, the rear face of the dome is offset inwardly from the reflective tube to allow light trapped in the prismatic portion between the exterior and interior surfaces of the dome to escape downwardly into the tube, thus increasing the percentage of light reaching the entrance of the skylight tube.

In the disclosed embodiment, the dome has a curved front face, a flat top face and a substantially vertical rear face, which provide a pleasing profile when the dome is mounted on a roof. The prismatic portion includes a plurality of vertical grooves each extending from the base of the rear face to the top edge of the rear face. The rear face is offset inwardly from the perimeter of the reflective tube such that the prismatic portion is positioned above the interior of the tube; thus, light trapped in the prismatic portion between the exterior and interior surfaces of the dome may escape downwardly into the reflective tube. 5 These and other objects, advantages, and features of the invention will be more fully understood and appreciated by reference to the detailed description of the preferred embodiment and the drawings.

DETAILED DESCRIPTION OF THE PREFERRED EMBODIMENT

Figure 1:
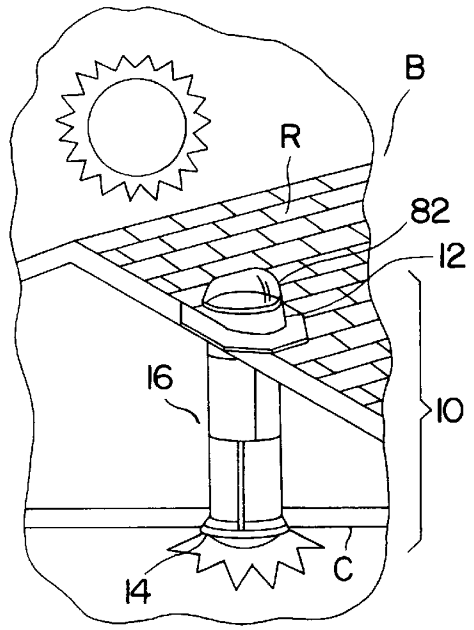
FIG. 1 is a perspective view showing a tubular skylight having the dome of the present invention mounted within a building.
Figure 2:
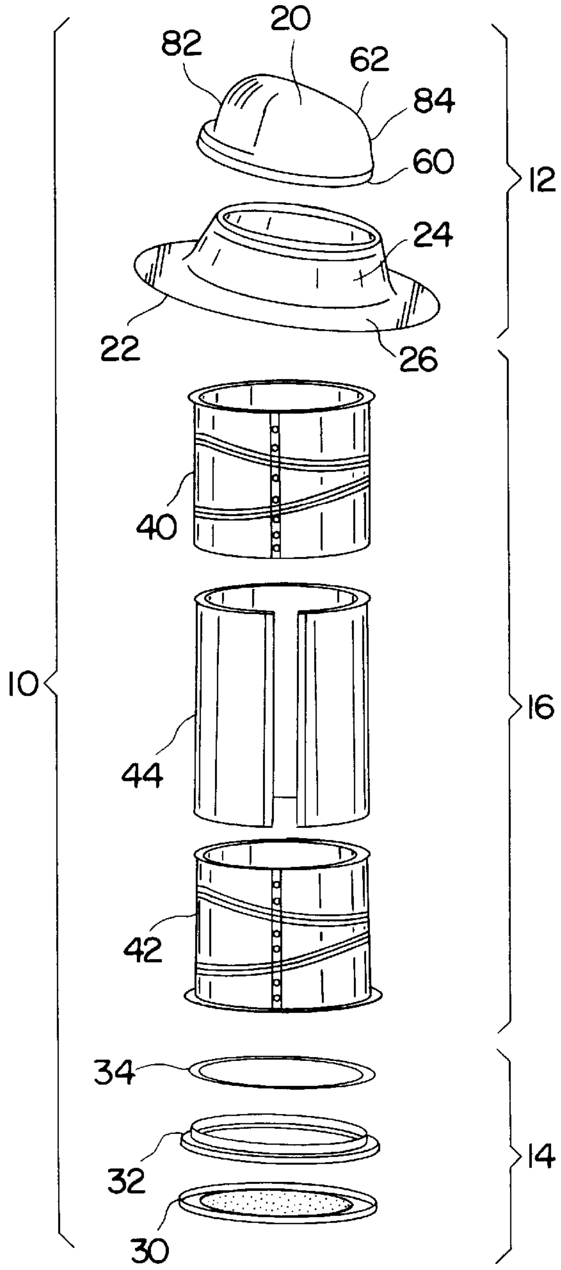
FIG. 2 is a perspective exploded view of the tubular skylight.

A tubular skylight constructed in accordance with a preferred embodiment of the invention is illustrated in FIGS. 1 and 2 and generally designated 10. As perhaps most clearly illustrated in FIG. 2, the skylight includes a dome assembly 12, a diffuser assembly 14, and a tube assembly 16 interconnecting the dome and diffuser assemblies 12 and 14. The skylight 10 is installed in a building B having roof R and ceiling C. More particularly, the dome assembly 12 is mounted within the roof R; and the diffuser assembly 14 is mounted within the ceiling C. The tubular assembly 16 extends between the dome assembly 12 and the diffuser assembly 14 to channel light from the dome assembly 12 to the diffuser assembly 14. With the exception of the dome, the skylight 10 is generally well known to those skilled in the art.

The dome assembly 12 includes a dome 20 and a roof flashing 22. The dome 20, which is new, will be described in greater detail below. The flashing 22 mounts within a building roof R to provide a structural support for the dome 20. The roof flashing 22 includes a stepped curb 24 and an integral flashing flange 26 extending therefrom. The roof flashing 22 is available in a variety of constructions to accommodate shingle roofs, tile roofs, and other selected applications.

The diffuser assembly 14 includes a diffuser 30, a ceiling trim ring 32, and a tube/ring seal 34. The diffuser 30 is a prismatic light diffuser although other diffuser styles may be used. Diffuser styles may be a personal preference or aesthetic choice. The ceiling trim ring 32 supports the diffuser 30 within the ceiling C. The tube/ring seal 34 fits about the tube assembly 16 as will be described and provides a mechanical interlock between the tube assembly 16 and the diffuser assembly 14.

The tube assembly 16 includes upper and lower adjustable tubes 40 and 42 respectively, and an interconnecting extension tube 44. The upper adjustable tube 40 fits within the roof flashing 22, and the lower adjustable tube 42 connects to the ceiling trim ring 32 by way of the tube/ring seal 34 as will be described. The extension tube 44 telescopically interfits with both of the adjustable tubes 40 and 42 to accommodate a variety of heights of the roof R above the ceiling C. Additional extension tubes 44 can be used as necessary to accommodate unusual heights between the roof R and the ceiling C.

Again, as thus far described, the tubular skylight components are conventional and generally well known to those in the relevant art. The novelty of the present invention resides in the dome 20 to be described hereinafter.

Figure 3:
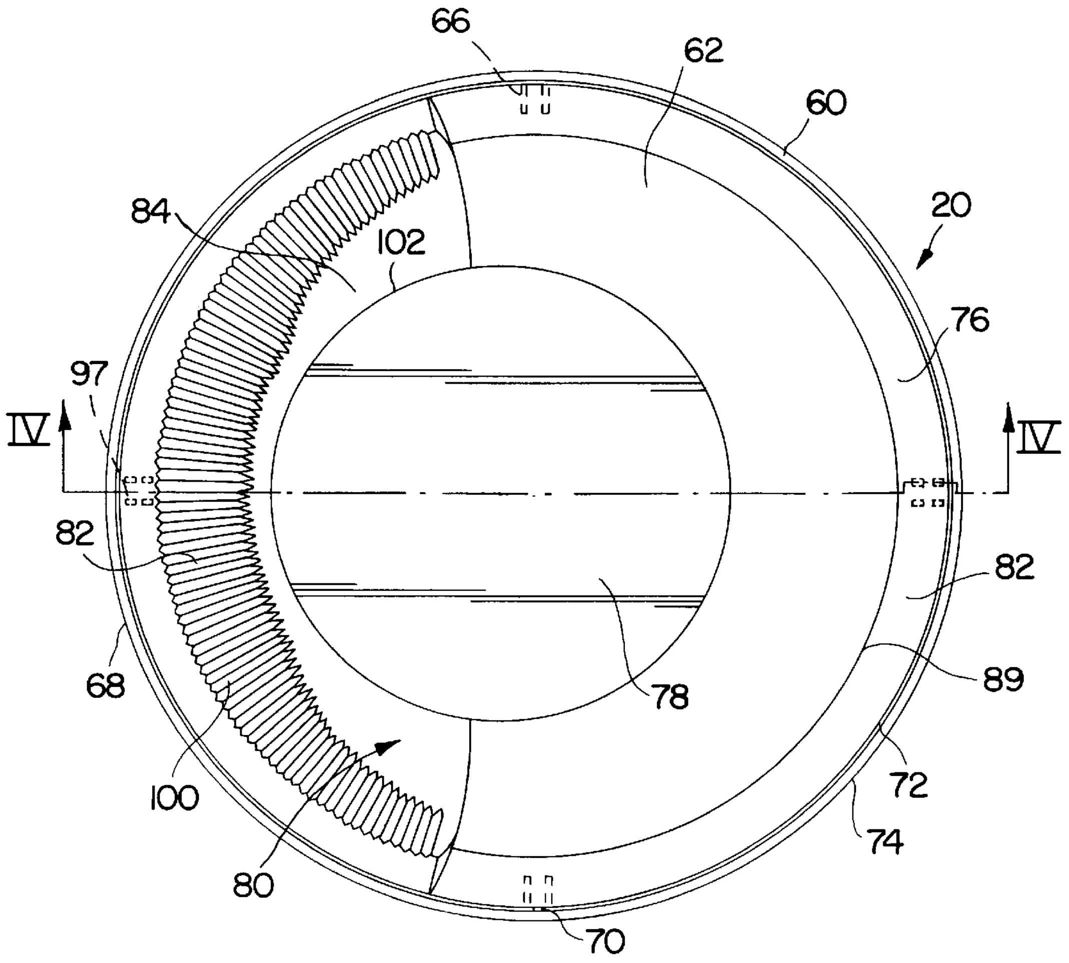
FIG. 3 is a top plan view of the dome.
Figure 4:
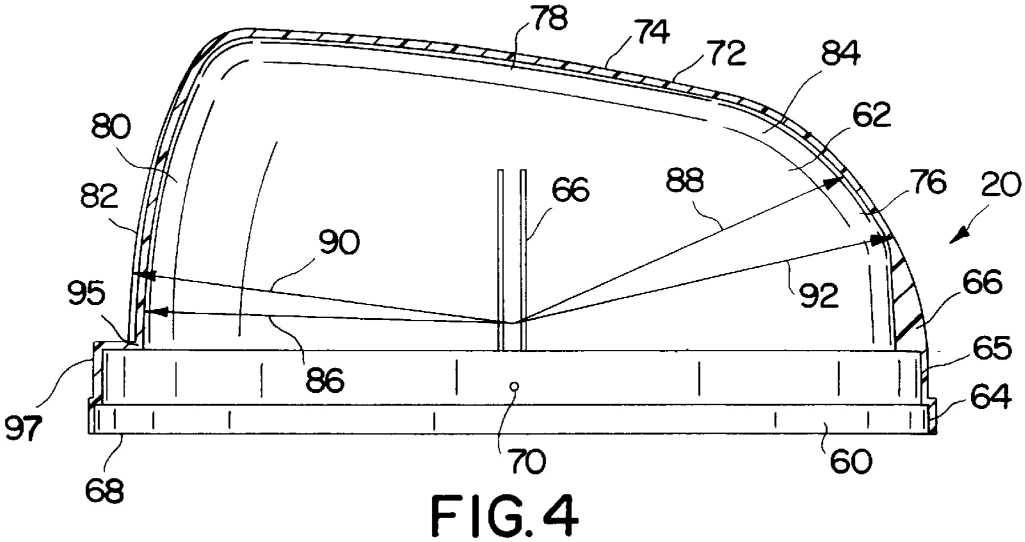
FIG. 4 is a sectional view of the dome taken along line IV—IV in FIG. 3.

The dome 20 is illustrated most clearly in FIGS. 3 and 4. The dome includes a circular base 60 and an upper portion 62 extending upwardly therefrom. The base 60 includes steps 64 and 65 that fit over and receive the stepped curb 24 of the roof flashing 22 (see FIG. 2). The second step 65 rests on the top of the curb 24 and is defined by four pairs of fingers 66 located at 90° intervals around the perimeter 68 of the base 60. Holes 70 are provided to receive fasteners (not shown) to secure the dome 20 to the stepped curb 24.

The upper portion 62 of the dome 20 includes an interior surface 72 and an exterior surface 74 which define an interior 75. The upper portion 62 includes a curved front face 76, a flat top face 78, and a substantially vertical rear face 80 extending downwardly from the top face 78. The rear face 80 preferably is inclined approximately 10 degrees from the vertical, and the rear face 80 preferably extends over no more than approximately one inch over the span of a fourteen inch diameter dome. The rear face 80 and the top face 78 meet at a sharp-cornered junction preferably having a rounded edge for aesthetic purposes.

The upper portion 62 includes a prismatic surface or portion 82 and a nonprismatic surface or portion 84. The prismatic portion 82 comprises the rear face 80 of the dome 20. The prismatic portion 82 is illustrated perhaps most clearly in FIG. 3 and includes the patterned surface covering a portion of the rear face 80 as described below. The interior surface 72 has an interior radius 86 in the area of the rear face 80 and a radius 88 in the remainder 89 of the upper portion 62. And the exterior surface 74 has an exterior radius 90 in the area of the rear face 80 and a radius 92 in the remainder 89 of the upper portion 62. The radius 92 is slightly greater than the radius 90.

Figure 6:
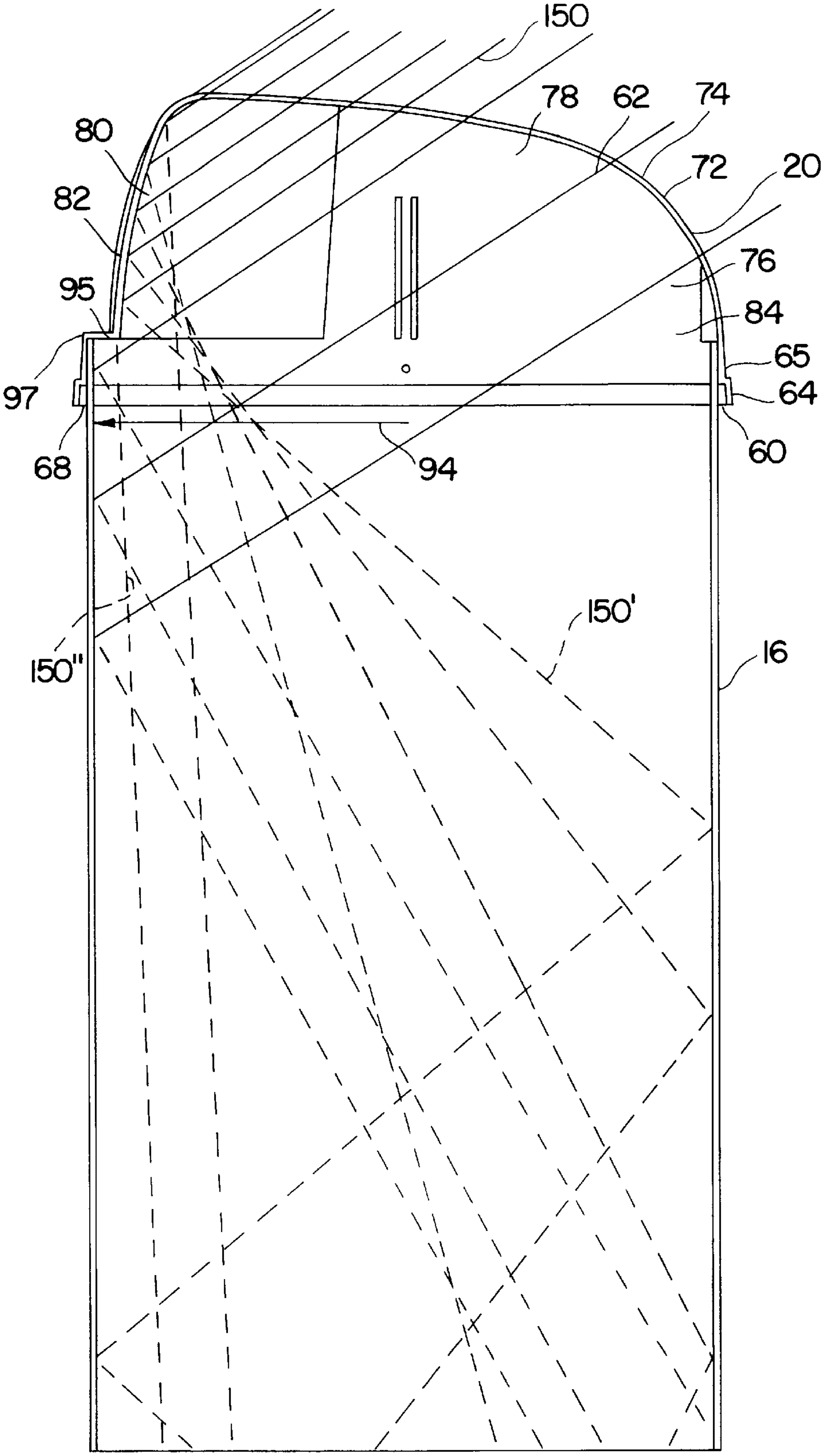
FIG. 6 is a schematic illustration of noon-day sun rays near the vernal and autumnal equinoxes.

Additionally, in the preferred embodiment, the radius 90 is 0.5 inches smaller than the interior radius 94 of the tube assembly 16 (seen best in FIG. 6). Thus, the interior and exterior surfaces 72 and 74 in the vicinity of the rear face 80 are positioned above the interior of the tube assembly 16. The lower edge 95 of the rear face 80 is connected to the base 60 by a right angle flange portion 97.

The remainder 89 of the upper portion 62 is generally uniform in thickness between the interior surface 72 and the exterior surface 74. The rear face 80 has an increased thickness from the prismatic portion 82. Because the prismatic portion 82 is uneven (i.e. grooved) the distance between the interior surface 72 and the exterior surface 74 varies. The minimum thickness in the prismatic portion 82 is approximately equal to the thickness in the remainder 89 of the upper portion 62, and the maximum thickness in the prismatic portion 82 is approximately twice the thickness of the remainder 89.

Figure 5:
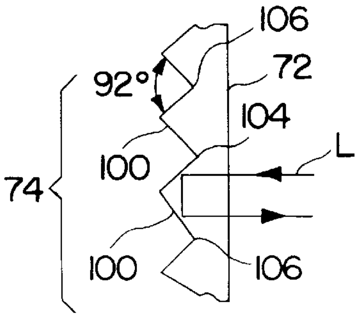
FIG. 5 is a fragmentary sectional view of the prismatic portion of the dome showing the grooves in the exterior surface.

The shape and configuration of the prismatic portion 82 is perhaps best illustrated in FIGS. 3 and 5. The prismatic portion 82 includes a plurality of grooves 100 that are molded, cut, or otherwise formed in the exterior surface 74. Each of the grooves 100 extends from the base 60 to a location short of the top edge 102 of the rear face 80. In the preferred embodiment, 37 first grooves 104 are formed at 4° intervals, and 38 second grooves 106 are formed at 4° intervals offset 2° from the first set of grooves 104 so that each first groove 104 is bracketed by a pair of second grooves 106. As currently contemplated, the grooves 100 are formed by molding; however, other forming techniques, such as cutting, can be used.

The exterior angle between the walls of a groove 100 when using the preferred material is preferably in the range of 86° to 94°, with the most preferred angle being 92°. The groove angles may change with other materials depending on their indices of refraction. The angle is selected so that direct light from the dome interior is reflected by the internal reflection of the prism—not refracted—as it strikes the interior side of the groove walls. The structure and effect of the described technique is disclosed in U.S. Pat. No. 4,839,781, issued Jun. 13, 1989 to Barnes et al, and entitled "Reflector/Refractor."

The entire dome 20 is preferably fabricated of injection-molded acrylic although other techniques, such as thermoforming, may be used. The currently preferred materials are those sold under the designations V825UVA-5A, ICI CP-75 UVA, ICI CP-75 HID, or A to Haas V825 HID by Rohm & Haas. For a dome 14 inches in diameter, the dome portion 20 is 0.114 inch thick in the nonprismatic portion 84 and up to 0.204 inch thick in the prismatic portion 82. Other UV stable materials suitable for skylight domes may be used and include polycarbonates and nylons. Other materials may be used if they provide the light transmittance. strength characteristics, and resistance to yellowing required in skylight domes The particular pattern of the prism will depend on the performance desired and the anticipated location of the skylight. The illustrated dome 20 has been designed for use at 40° latitude as representative of a "normal" U.S. location. The pattern follows the highest path of the sun, which of course occurs during the summer.

The light reflectance provided by the prismatic portion 82 is perhaps best illustrated in FIG. 5. Each of the grooves 100 provides two apparent reflective surfaces to light rays striking the surfaces from inside the dome because of the high index of refraction. Consequently, light impinging on the grooves 100 from the interior of the dome 20 are reflected back into the interior of the dome 20.

Turning specifically to FIG. 5, a light ray L from the interior of the dome passes through the interior surface 72, then reflects off the surfaces of two grooves 100 to be returned to the dome interior. Consequently, light at low angles which would pass directly through the dome 20 is instead reflected back into the dome interior.

The prismatic portion 82 does not significantly block ambient light from passing through the dome 20. Therefore, the dome 20 does not significantly reduce the amount of ambient light; and the dome 20 does not decrease the amount of direct light passing into the skylight. The only losses (approximately 8% in the preferred material) are due to the material from which the dome 20 is fabricated.

Assembly and Operation

The tubular skylight 10 is installed within a building in conventional fashion. Holes, preferably vertically aligned to provide the best light transmission, are cut in the roof R and the ceiling C. The roof flashing 22 is installed in the roof R. The upper adjustable tube 40 is fitted onto the stepped curb 24 of the roof flashing 22 and slid downwardly until the upper edges of both are aligned. The dome 20 is fitted over the stepped curb 24 (with the upper adjustable tube 40 fitted therein) and secured in position using screws (not shown).

The ceiling trim ring 32 is secured to the underside of the ceiling C. The tube/ring seal 34 is placed over the lower adjustable tube 42, and the assembly is pushed into the ceiling trim ring 32 from above the ceiling C. The extension tube 44 is then slid as necessary to a connecting position between the upper and lower adjustable tubes 40 and 42, which provide angular alignment for the extension tube 44. All seams are taped with duct tape. Finally, the diffuser 30 is installed within the trim ring 32 using a partial-turn coupling.

FIGS. 6–9 illustrate the functional performance of the new dome 20. Turning first to FIG. 6, the dome 20 and tube assembly 16 are schematically illustrated. Direct light rays 150 are shown entering the skylight when the sun is high in the sky. When the sun is at this angle, virtually all of the direct rays 150 pass through the non-prismatic portion 84 of the dome 20 to enter the skylight 10 in conventional fashion. The reflected rays 150' are illustrated in dotted lines and illustrate how the light is reflected downwardly through the skylight assembly.

The light rays enter the dome primarily through the front and top faces 76 and 78, avoiding the substantially vertical rear face 80. Thus, the prismatic portion 82 does not cast shadows on the underside of the diffuser 30.

Figure 7:
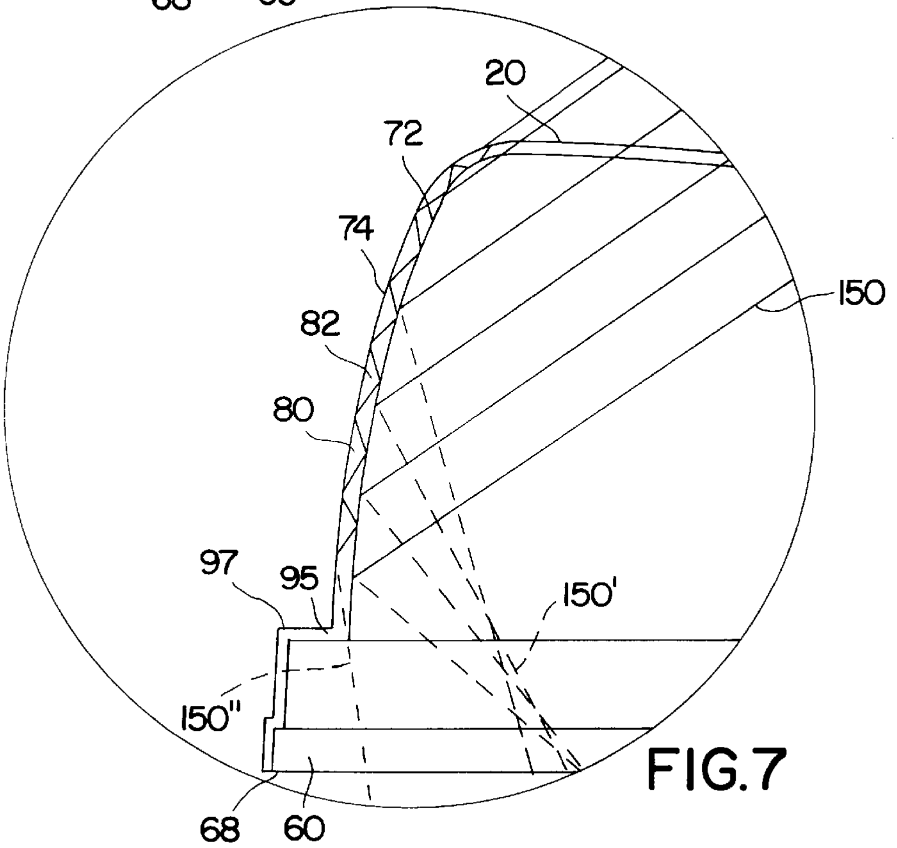
FIG. 7 is an expanded view of the rear face of the dome from FIG. 6.

However, as can be seen in FIG. 6 and more easily in FIG. 7, a portion of the light rays 150 entering the dome pass through the interior surface 72 of the rear face 80 and are reflected by the prismatic surface 82. Rather than passing back through the interior surface 72 and into the interior of the dome 20, a portion of the rays 150" become trapped between the interior and exterior surfaces 72 and 74 due to the refractive index of the material. The amount of light which is trapped depends on the index of refraction of the material.

As the rays 150" are reflected by one surface 72 or 74 towards the other, the rays 150" descend through the interior 75 of the rear face 80, eventually exiting from the interior 75 of the rear face 80 through the offset lower edge 95 and into the tube assembly 16. Exiting through the lower edge 95 allows the rays 150" to have a more centrally located reflection angle, which enables a greater percentage of light to reach the diffuser. Reflective coatings on the adjustable tubes 40 and 42 and on the extension tube 44 are unable to reflect 100% of the available light, and depending on the reflective material, a portion of the light is absorbed rather than reflected. Thus, it is preferable to have a centrally located reflection angle so that the light ray 150 is reflected fewer times in the tubes 40, 42, and 44 to preserve the quantity of light arriving at the diffuser 30. Enabling these additional rays 150" to escape the interior 75 of the rear face 80 provides 6–10% additional light into the tube assembly 16. If the light rays 150" were unable to escape the interior 75 of the rear face 80, such as if the edge 95 were not offset inwardly, they would be reflected between the interior and exterior surfaces 72 and 74 until they are eventually absorbed by the material.

Figure 8:
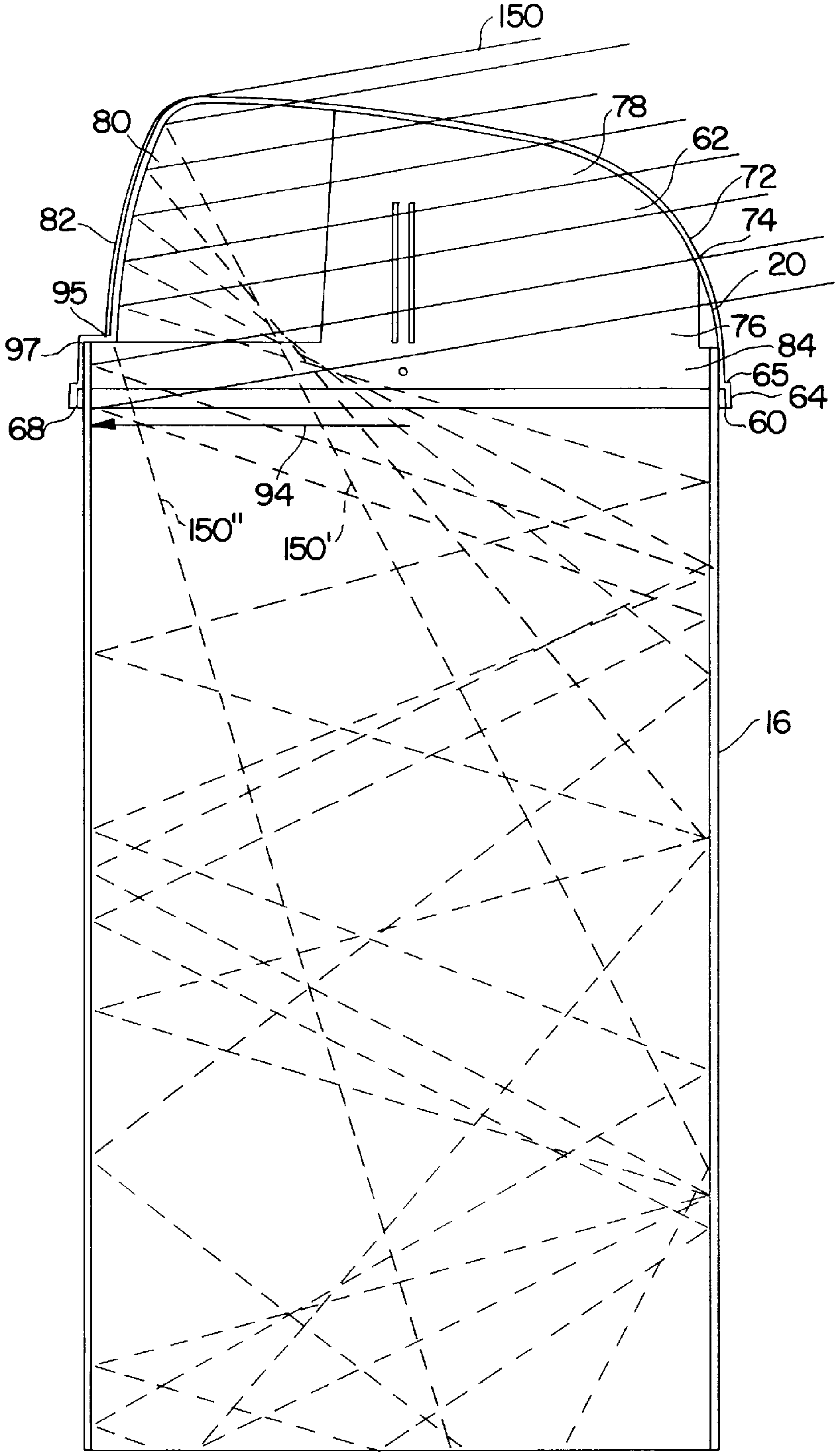
FIG. 8 is a schematic illustration of morning sun rays near the vernal and autumnal equinoxes.

FIG. 8 illustrates the performance of the skylight dome when the sun is relatively low in the sky. Specifically, the direct sunlight rays 150 arrive at the skylight dome 20 only slightly inclined from the horizontal. The direct rays 150 pass directly through the non-prismatic portion 84. Without the prismatic portion 82 of the present invention, the direct rays 150 would continue to pass through the skylight dome 20 so that none of those rays 150 would pass downwardly into the tube assembly 16. Instead, the prismatic portion 82 reflects the direct rays 150 downwardly through the dome 20 at a variety of angles. The reflected rays 150' are illustrated as dashed lines and pass downwardly at a variety of reflected angles.

Figure 9:
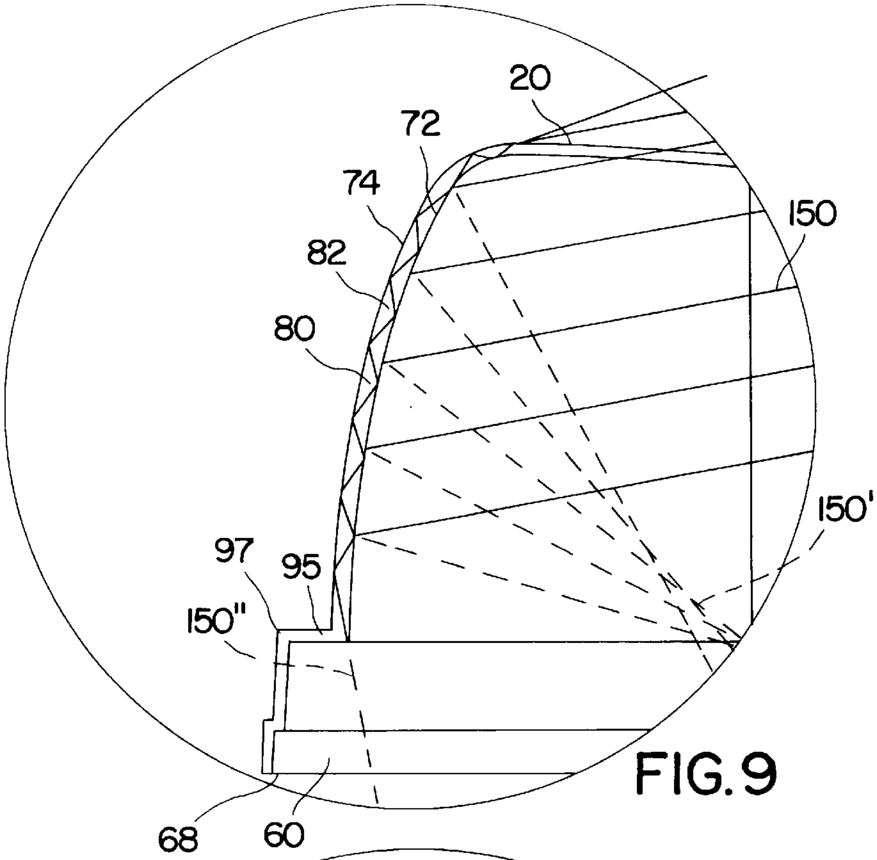
FIG. 9 is an expanded view of the rear face of the dome from FIG. 8.

As seen more easily in FIG. 9, the light rays 150" slightly inclined from the horizontal may also pass through the interior surface 72 and become trapped between the interior and exterior surfaces 72 and 74 similarly to the light rays 150" seen in FIGS. 6–7. However, these rays 150" also descend through the interior 75 of the rear face 80 and eventually exit from the interior 75 through the offset lower edge 95 and into the tube assembly 16. Additionally, these rays 150" then have a more centrally located reflection angle, allowing for fewer reflections as they descend the tube assembly 16.

The object of the present invention is to increase the amount of light which reaches the diffuser 30 by allowing rays 150 trapped within the interior 75 of the rear face 80 to exit downwardly into the tube assembly 16 and to lessen any shadowing effect created by the prismatic surface 82 on the underside of the diffuser 30.

The present invention greatly enhances the performance of the tubular skylight by directing or steering a larger percentage of the available light downwardly through the tube assembly 16. The placement of the prismatic surface 82 on the substantially vertical rear face 80 additionally lessens the shadow effect on the underside of the diffuser 30.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

We claim:

1. An improved tubular skylight including a dome to be mounted on a roof and a reflective tube extending downwardly from said dome and defining an interior, wherein the improvement comprises said dome comprising:

a base and an upper portion extending therefrom, said upper portion having an interior and an exterior surface, said exterior surface including a generally smooth portion and a prismatic portion, said upper portion having a front face, a rear face, and a top face therebetween, said rear face defining said prismatic portion, said rear face being located over said interior of said reflective tube, whereby said prismatic portion is offset inwardly towards said interior of said reflective tube.

2. The skylight of claim 1 wherein said rear face is substantially vertical.

3. The skylight of claim 2 wherein said front face is generally curved and said substantially vertical rear face has an angle of inclination from the vertical of 10 degrees.

4. The skylight of claim 3 including a top and a bottom edge wherein said prismatic portion includes a plurality of vertical grooves extending between said top and said bottom edges.

5. The skylight of claim 4 wherein light rays, upon entering said upper portion, pass primarily through said front and top faces.

6. The skylight of claim 2 wherein said front face and said top face meet at a sharp-cornered junction.

7. The skylight of claim 6 including a top and a bottom edge wherein said prismatic portion includes a plurality of vertical grooves extending between said top and said bottom edges.

8. The skylight of claim 7 wherein light rays, upon entering said upper portion, pass primarily through said front and top faces.

9. An improved tubular skylight including a dome to be mounted on a roof and a reflective tube extending downwardly from said dome and defining an interior, wherein the improvement comprises said dome comprising:

a base and an upper portion extending therefrom, said upper portion including a front face, a substantially vertical rear face, and a top face therebetween, said rear face defining a prismatic portion, wherein light rays, upon entering said upper portion, pass primarily through said front and top faces, said rear face being located over said interior of said reflective tube, whereby said prismatic portion is offset inwardly towards said interior of said reflective tube.

10. The skylight of claim 9 where said front face is generally curved and said substantially vertical rear face has an angle of inclination from the vertical of 10 degrees.

11. The skylight of claim 10 including a top and a bottom edge wherein said prismatic portion includes a plurality of vertical grooves extending between said top and said bottom edges.

12. The skylight of claim 9 wherein said front face and said top face meet at a sharp-cornered junction.

13. The skylight of claim 12 including a top and a bottom edge wherein said prismatic portion includes a plurality of vertical grooves extending between said top and said bottom edges.

14. A skylight assembly comprising:

a tube having an interior defined by a reflective interior surface; and a dome having a base and an upper portion extending above said base, said upper portion including a prismatic portion terminating in a lower edge, said lower edge being located over said tube interior, wherein light rays within said prismatic portion can exit said prismatic portion through said lower edge directly into said tube interior.

15. The skylight assembly of claim 14 wherein said upper portion includes a front face, a substantially vertical rear face, and a top face therebetween, said rear face including said prismatic portion, said front face being generally curved and said substantially vertical rear face having an angle of inclination from the vertical of approximately 10 degrees.

16. The skylight assembly of claim 14 wherein said prismatic portion further includes a top edge and a plurality of vertical grooves extending between said top edge and said lower edge.

17. The skylight assembly of claim 15 wherein said front face and said top face meet at a sharp-cornered junction.

18. The substantially vertical rear face of claim 17 including a top and a bottom edge wherein said prismatic portion includes a plurality of vertical grooves extending between said top and said bottom edges.

19. The skylight assembly of claim 14 further comprising:

a reflective tube extending downwardly from said dome and defining a tube interior, said upper portion having an interior surface and an exterior surface, said exterior surface of said rear face defining said prismatic portion, said rear face being located over said interior of said reflective tube, whereby said prismatic portion is offset inwardly towards said interior of said reflective tube.

20. A skylight assembly comprising:

a tube to be mounted in a building between a roof and a ceiling, said tube having an interior;

a skylight having a base and a dome, said dome including prism means for reflecting light downwardly through said skylight, said prism means including a lower margin; and positioning means for positioning said tube and said base in a desired relationship with said lower margin positioned over the interior of said tube, whereby light within said prism portion exits said prism portion through said lower margin and into said tube.

* * * * *

UNITED STATES PATENT AND TRADEMARK OFFICE

CERTIFICATE OF CORRECTION

PATENT NO. : 5,983,581

DATED : November 16, 1999

INVENTOR(S) : David A. DeBlock et al

It is certified that error appears in the above-indentified patent and that said Letters Patent is hereby corrected as shown below:

Claims 18 and 19 should be deleted.

Signed and Sealed this

Eleventh Day of July, 2000

Attest:

Q. TODD DICKINSON

*Attesting Officer*

*Director of Patents and Trademarks*